No. 12,675. REISSUED JULY 23, 1907.

J. T. H. MITCHELL.

COMBINED LETTER SHEET AND ENVELOP.

APPLICATION FILED MAR. 18, 1907.

Witnesses:

H. S. Austin

G. H. Nelson

Inventor:

John T. H. Mitchell, by

Charles Richard Stanley

Atty.

UNITED STATES PATENT OFFICE.

JOHN T. H. MITCHELL, OF CHICAGO, ILLINOIS.

COMBINED LETTER-SHEET AND ENVELOP.

No. 12,675. Specification of Reissued Letters Patent. Reissued July 23, 1907.

Original No. 827,809, dated August 7, 1906, Serial No. 280,634. Application for reissue filed March 18, 1907. Serial No. 363,158.

*To all whom it may concern:*

Be it known that I, JOHN T. H. MITCHELL, a citizen of the United States, residing at Chicago, in the county of Cook and State of Illinois, have invented a certain new and useful Improvement in a Combined Letter-Sheet and Envelop, of which the following is a full, clear, and exact description, such as will enable others skilled in the art to which it appertains to make and use the same.

My invention relates to improvements in advertising devices and has particular reference to improvements in advertising devices of the class known as postal letters or cards and envelops.

The object of my invention is to provide a combined letter and envelop which shall at once serve the purpose of a personal communication and the purpose of a cover, envelop or closure for an article to be sent through the mails.

My invention consists generally in a sheet of thick paper or card board of substantially the size of a commercial letter and bearing a personal letter or communication on its inner face, said sheet being transversely scored and thereby formed into upper and lower flaps and an intermediate portion and said lower flap being formed or adapted to retain a postal card, or the like, when folded between the other parts or portions, suitable means being provided for fastening the free edges of the folded device.

The invention will be more readily understood by reference to the accompanying drawings forming a part of this specification, and in which:—

Figure 1:
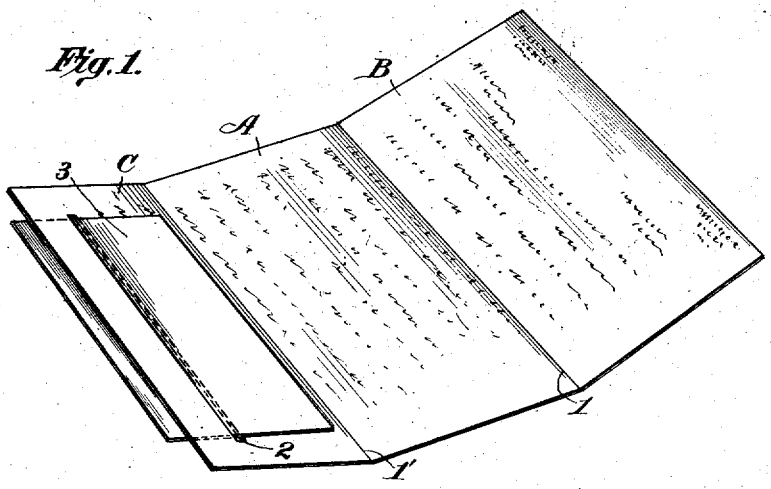
Figure 2:
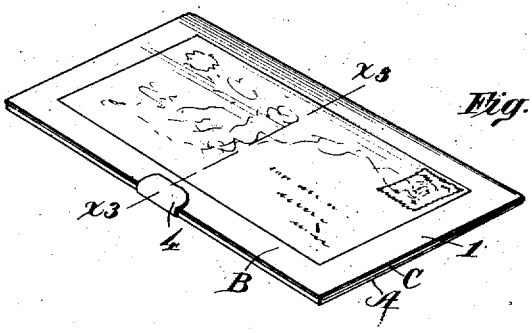
Figure 3:
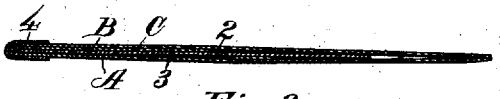
Figure 4:
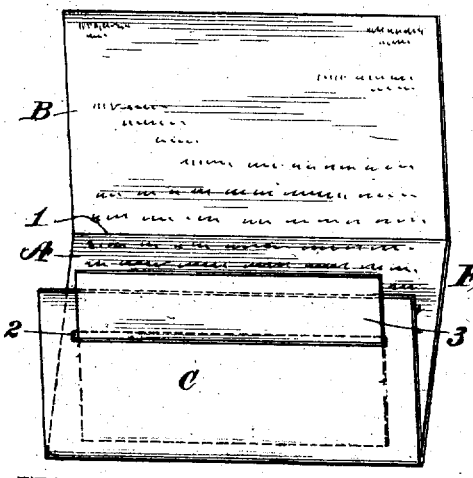

Figure 1 is a perspective view of an advertising device embodying my invention, the same being shown in open or unfolded condition; Fig. 2 is a perspective view of the same closed and sealed for mailing; Fig. 3 is a cross section taken on the line $x^3$—$x^3$ of Fig. 2; and Fig. 4 is a perspective view of the device partially folded.

In these drawings I have shown the preferred form of my invention. As shown in Fig. 1, the sheet of heavy paper or card board is utilized as a personal letter sheet, the heading and communication being printed or written upon the inner face thereof. The sheet is transversely scored on two lines 1—1′, forming two portions A and B, which are of substantially the same width, and a narrow portion C, of less width. This narrower portion or bottom of the letter sheet is provided with a cross slot, 2, of sufficient length to receive a return postal card or the like, 3, to be sent to the addressee. The outer face or side of one of the wider portions is provided with the address and the stamp. The insert, 3, having been placed in the cross slit or slot, 2, the lower portion or flap containing same is folded against the intermediate portion of the sheet, after which the upper portion or flap, B, is folded down over the part, C, and over the card or insert, 3, held thereby. The free edges of the parts, A and B, are then fastened by means of a small gummed sticker or seal 4. When folded and sealed the device constitutes an open ended envelop, which though it contains a personal letter may be sent through the mails for one cent. The insert or postal card being securely held by the inclosed portion of the sheet can not escape from the open ended envelop. Upon receiving the device the addressee readily breaks the seal, whereupon the personal letter or other communication and the inclosed piece or insert are disclosed to him.

Having thus described my invention, what I claim as new and desire to secure by Letters Patent is,

1. A combined letter sheet and envelop, comprising a transversely scored sheet of thick paper or card-board, having upper and lower flap portions and an intermediate portion, said portions adapted to be folded together, and when folded, forming an open-ended envelop and one of said flap portions being formed to receive an inclosure and hold it against endwise movement in the envelop thus formed, substantially as described.

2. A combined letter sheet and envelop, comprising a transversely scored sheet of thick paper or card-board, having upper and lower flap portions and an intermediate portion, said portions being adapted to be folded together, and when folded, forming an open-ended envelop, means being formed from and by said lower flap portion for holding an inclosure against endwise movement within the envelop thus formed, substantially as described.

3. A combined letter sheet and envelop, comprising a substantially rectangular sheet of thick, ungummed paper or card-board, scored across its face and thus formed into upper and lower flap portions and an intermediate portion, adapted, when folded, to form an open-ended envelop, and said lower flap portion being formed to receive and hold an inclosure, such as a post card, against endwise motion within the envelop thus formed, substantially as described.

4. A combined letter sheet and envelop, comprising a sheet of thick paper or card-board, scored transversely and thus formed into upper, intermediate and lower portions, which are folded together and which form an open-ended envelop, said lower portion being formed to hold an inclosure, such as a postal, against endwise movement in such envelop, in combination with an inclosure thus held and a sticker fastening the sheet in folded condition, substantially as described.

5. A combined letter sheet and envelop, comprising a sheet of thick paper or card-board, transversely scored to form an intermediate portion and upper and lower flaps of different widths, adapted, when folded, to form an open-ended envelop and the narrower of said flaps being formed to receive and hold an inclosure, such as a post card, against endwise movement in such envelop, substantially as described.

6. A device of the class specified, comprising a folded letter having its bottom provided with a cross-slot, a postal inserted in said slot; and a fastening device holding said letter in folded condition.

7. A device of the class specified, comprising a folded letter-sheet provided with a cross-slot, a postal inserted in said slot, and a sticker holding said letter in closed condition.

In testimony whereof, I have hereunto set my hand, this 11th day of March, 1907, in the presence of two subscribing witnesses.

JOHN T. H. MITCHELL.

Witnesses:
A. W. NELSON,
JOHN R. LEFEVRE.